July 17, 1923.

R. ARROWSMITH

SHOCK ABSORBER

Filed Jan. 10, 1922

1,461,959

Robert Arrowsmith
INVENTOR

BY Victor J. Evans
ATTORNEY

WITNESS:

Patented July 17, 1923.

1,461,959

UNITED STATES PATENT OFFICE.

ROBERT ARROWSMITH, OF HOMESTEAD, MONTANA.

SHOCK ABSORBER.

Application filed January 10, 1922. Serial No. 528,282.

*To all whom it may concern:*

Be it known that I, ROBERT ARROWSMITH, a citizen of the United States, residing at Homestead, in the county of Sheridan and State of Montana, have invented new and useful Improvements in Shock Absorbers, of which the following is a specification.

This invention relates to shock absorbers, and comprehends a construction which is susceptible of self-adjustment to adapt itself to variation of loads, and at the same time allow perfect freedom of the spring.

More specifically stated, the invention embodies what may be termed double or twin compression arms which are pivoted for relative movement, and associated with the terminals of the main spring of the vehicle in a manner to eliminate all end strain on the main spring which frequently causes breakage of said spring.

Another object of the invention resides in providing a resilient element between one of the compression arms and the main spring, a construction and arrangement of parts which minimizes the possibility of side skidding of the vehicle.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1:
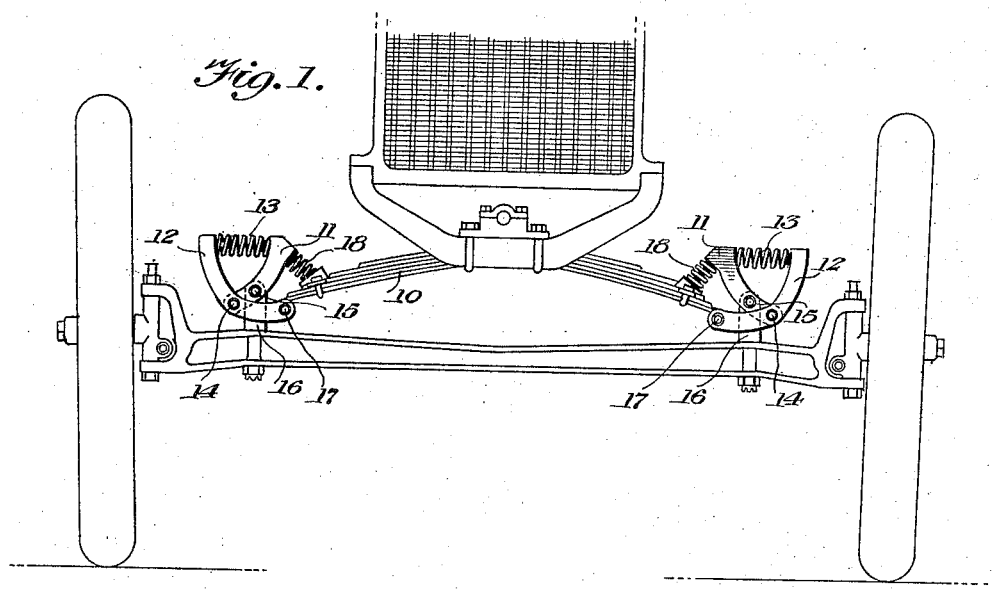
Figure 1 is a view showing association of the shock absorber with the main spring of the vehicle.
Figure 2:
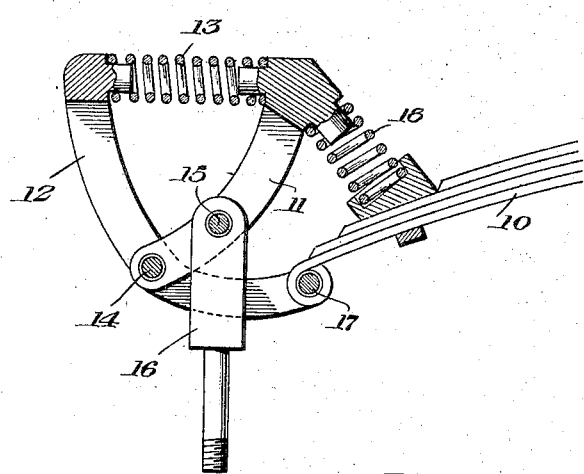
Figure 2 is an enlarged detail view, partly in section of one of the shock absorbing devices.

Referring to the drawing in detail, 10 indicates the main spring of the vehicle, the opposed ends of which are associated with the shock absorbing device which forms the subject matter of the present invention. Each of these devices embodies what may be termed double or twin compression arms indicated at 11 and 12 respectively, the arms being oppositely curved and supporting between their corresponding free extremities, a cushioning element or coiled spring 13, the compression arm 11 is slightly shorter than its twin arm 12, and one end of the short arm 11 is pivoted as at 14 upon the arm 12 at an appropriate point between the ends of the latter. This arm 11 is also pivoted as at 15, an appreciable distance from its pivotal connection with the arm 12, the pivotal connection 15 associating the arm 11 with a perch 16 of any suitable construction. One end of the arm 12 curves below the arm 11, and extends beyond its pivotal connection with the perch 15, this extremity of the arm 12 having pivotal connection as at 17 with the adjacent extremity of the main spring 10. The construction is such, that the companion or twin arms 11 and 12 of each shock absorber device is susceptible of independent relative movement, so that the said devices are susceptible of adjusting themselves to various loads, and to assist in fully and completely absorb the shocks and jars of the running gear of the vehicle (not shown), so that such shocks cannot be transmitted to the body of the vehicle. In addition to this feature, the relative movements of the companion or twin arms relieve the main spring 10 of undue strain, to which such springs are generally subjected and which frequently results in breakage of the same.

Interposed between the spring 10 and the adjacent terminal of the arm 11 is a coiled spring or the like 18, which materially minimizes the possibility of skidding of the car side-wise, as the side throw or thrusting of a car is allowed to rest on the spring.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A shock absorber for vehicles comprising in combination with a main spring, of twin compression arms, a cushioning element interposed between and connecting the free extremities of said arms, one end of one of said arms being pivoted upon the other of said arms at a point in its length, a perch pivotally supporting the first mentioned arm, the said second mentioned arm having one end curved beneath the first mentioned arm and pivotally connected with the adjacent extremity of the main spring, and a cushioning element interposed between said curved extremity of the second mentioned arm and the main spring for the purpose specified.

2. A shock absorber for vehicles comprising in combination with a main spring, of oppositely curved arms of relatively different lengths, one arm being pivoted to the adjacent end of the main spring, a stationary perch, the other arm being pivoted on said perch adjacent one end, said end of the last mentioned arm being pivoted to the first mentioned arm at a point in its length, a coiled spring interposed between the free ends of the respective arms, and a second coiled spring interposed between the free end of the second mentioned arm and said main spring as and for the purpose specified.

In testimony whereof I affix my signature.

ROBERT ARROWSMITH.